(12) United States Patent
Nakamura et al.

(10) Patent No.: US 12,710,095 B2
(45) Date of Patent: Aug. 18, 2026

(54) PULLEY WITH TWO FLANGES

(71) Applicant: NAKANISHI METAL WORKS CO., LTD., Osaka (JP)

(72) Inventors: Masayoshi Nakamura, Osaka (JP); Ryotaro Taniguchi, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 19/181,972

(22) Filed: Apr. 17, 2025

(65) Prior Publication Data

US 2026/0160321 A1 Jun. 11, 2026

(30) Foreign Application Priority Data

Apr. 23, 2024 (JP) ................................ 2024-069510

(51) Int. Cl.
*F16H 55/48* (2006.01)

(52) U.S. Cl.
CPC .................................. *F16H 55/48* (2013.01)

(58) Field of Classification Search
CPC ...................................................... F16H 55/48
See application file for complete search history.

(56) References Cited

U.S. PATENT DOCUMENTS 1,999,409 A * 4/1935 Fox ........................ F16H 55/42 156/289
2,673,470 A * 3/1954 Cosmos ................. F16H 55/48 152/323
3,633,432 A * 1/1972 Horsey .................. F16H 55/48 474/181
3,696,685 A * 10/1972 Lampredi .......... F16H 57/0025 474/903
3,772,928 A * 11/1973 Gobeille ................ F16H 55/48 474/902
3,788,155 A * 1/1974 Cigala .................... F16H 55/48 474/190
4,052,020 A * 10/1977 Knox .................... B65H 75/14 242/608.8
4,177,685 A * 12/1979 DeLancey .............. F16H 55/48 474/902
4,193,310 A * 3/1980 Boyer .................... D06F 58/08 384/417
4,366,609 A * 1/1983 Speer ..................... F16H 55/48 264/266

(Continued)

FOREIGN PATENT DOCUMENTS

JP 2013-096500 A 5/2013

*Primary Examiner* — Henry Y Liu
(74) *Attorney, Agent, or Firm* — Kratz, Quintos & Hanson, LLP

(57) ABSTRACT

In a pulley with two flanges, a pulley body and a flange body are joined by ultrasonic welding with molten resin in a resin reservoir defined by: a first space defined by a first gap and a second gap, the first gap being between an annular connecting surface connecting a first outer cylindrical surface and a second outer cylindrical surface of an inner-diameter portion of the flange body and an end face of a core metal of the pulley body, the second gap being between the second outer cylindrical surface and an inner cylindrical surface of a resin portion in the pulley body; and a second space defined by a third gap between the second outer cylindrical surface and the inner cylindrical surface of the core metal.

1 Claim, 8 Drawing Sheets

(56) References Cited

U.S. PATENT DOCUMENTS 4,468,210 A * 8/1984 McCutchan, Jr. ...... F16H 55/44 474/902
4,473,363 A * 9/1984 McCutchan, Jr. ...... F16H 55/48 474/190
4,571,226 A * 2/1986 Molloy ............... B29C 65/0672 474/902
4,722,722 A * 2/1988 Rampe .................... F16H 55/48 474/161
4,946,427 A * 8/1990 Rampe .................... F16H 7/023 29/893
5,069,654 A * 12/1991 Rampe .................. F16D 1/0805 403/376
5,368,525 A * 11/1994 Funahashi ............... F16H 55/48 474/190
5,476,423 A * 12/1995 Meyer ................... B29C 65/665 474/166
5,507,698 A * 4/1996 Kuribayashi ........... F16H 55/48 474/170
5,931,755 A * 8/1999 Mailey ................ B29C 45/0005 474/190
6,074,316 A * 6/2000 Murrietta, Sr. ......... F16H 55/30 474/96
6,089,833 A * 7/2000 Glanfield .................. F01P 5/10 474/97
8,096,204 B2 * 1/2012 Imagaki .................. F16H 55/06 74/DIG. 10
8,646,352 B2 * 2/2014 Tanaka ................. B62D 5/0409 74/449
9,175,763 B2 * 11/2015 Wolf ....................... F16H 55/48
9,371,901 B2 * 6/2016 Jung ..................... F16H 55/171
9,581,233 B2 * 2/2017 Manzoor ............. F16F 15/1442
9,599,209 B2 * 3/2017 Manzoor ............. F16F 15/1442
9,611,858 B2 * 4/2017 Furusawa ............... F04D 29/04
9,637,164 B2 * 5/2017 Shavrnoch ........... B62D 5/0424
9,958,050 B2 * 5/2018 Kolloch .................. F16H 55/48
10,190,654 B2 * 1/2019 Manzoor ................. F16H 55/36
10,526,006 B2 * 1/2020 Shavrnoch ........... B62D 5/0424
10,981,593 B2 * 4/2021 Shavrnoch ............ F16H 55/171
10,989,293 B2 * 4/2021 Feuerborn ............. F16H 55/171
11,148,709 B2 * 10/2021 Lee ......................... F16H 55/48
11,162,570 B2 * 11/2021 Kinoshita ............... F16H 55/40
11,759,985 B2 * 9/2023 Nakamura .......... B29C 45/0025 428/35.7
12,091,103 B2 * 9/2024 Messadi ............... B62D 5/0445
12,209,649 B2 * 1/2025 Zimmer ................. B23K 26/60
12,276,327 B2 * 4/2025 Yamamori ........ B29C 45/14491
12,449,231 B2 * 10/2025 Zimmer .................. F41C 23/18
2003/0132677 A1 * 7/2003 Tabuchi .................. F16H 55/49 310/90
2003/0139240 A1 * 7/2003 Chen ....................... F16D 1/112 474/170
2003/0195072 A1 * 10/2003 Redmond ............... F16H 55/30 474/152
2006/0264286 A1 * 11/2006 Hodjat .................. F16H 55/171 474/152
2007/0232428 A1 * 10/2007 Hamada ................ F16C 35/067 474/166
2008/0161141 A1 * 7/2008 Joo ......................... F16H 55/48 474/8
2008/0219607 A1 * 9/2008 Murao .................... F16H 55/48 384/417
2009/0282939 A1 * 11/2009 Rogowski ............... F16H 55/06 74/424.5
2011/0070987 A1 * 3/2011 Swane .................. F16C 13/006 384/489
2013/0337952 A1 * 12/2013 Berruet ................... F16H 55/36 474/94
2014/0064931 A1 * 3/2014 Furusawa ............... F16H 55/36 415/122.1
2014/0090921 A1 * 4/2014 Shavrnoch ........... B62D 5/0448 474/166
2014/0100070 A1 * 4/2014 Jung ..................... F16H 55/171 474/161
2014/0194237 A1 * 7/2014 Wolf ....................... F16H 55/48 474/166
2015/0133248 A1 * 5/2015 Wang ...................... F16H 55/49 474/152
2016/0003339 A1 * 1/2016 Roberts, III ............ F16H 55/17 74/446
2016/0047456 A1 * 2/2016 Kolloch ................ F16H 55/171 474/161
2016/0195162 A1 * 7/2016 Manzoor ............. F16F 15/1442 474/166
2017/0190353 A1 * 7/2017 Shavrnoch .............. F16H 55/48
2018/0274648 A1 * 9/2018 Feuerborn ............. F16H 55/171
2019/0186611 A1 * 6/2019 Kinoshita ............... F16H 55/40
2019/0277384 A1 * 9/2019 Feuerborn ............... F16H 55/48
2020/0108855 A1 * 4/2020 Shavrnoch .............. F16H 55/48
2020/0141479 A1 * 5/2020 Feuerborn ............... F16H 55/48
2020/0182345 A1 * 6/2020 Gu .......................... F16H 55/17
2020/0292048 A1 * 9/2020 Feuerborn ............. F16H 55/171
2022/0228656 A1 * 7/2022 Yamamori ............ F16H 55/171
2022/0250294 A1 * 8/2022 Nakamura ........ B29C 45/14311

* cited by examiner 3
5
4
A
4A
6
F2
6A
G0
B
J2
D
G2
1
G1
6C
S1
E
S2
2
2B
2A
6B
C
J
T
R
RI
RO
G3

3
5
4
A
4A
6
F2
6A
G0
B
J2
D
G2
1
G1
6C
S1
E
S2
6B
2
2B
2A
C
J
T
R
RI
RO
G3

3
5
4
A
4A
6
F2
G0
6A
B
D
G2
J2
6C
1
G1
S1
U
E
S2
6B
2
2B
2A
J
C
T
R
RI
RO
G3

3
5
4
A
4A
6
F2
6A
G0
B
J2
D
G2
1
G1
6C
S1
F
E
S2
V
6B
2B
2
C2
J
2A
B2
T
C
R
RI
G3
RO

PULLEY WITH TWO FLANGES

FIELD

The present invention relates to a pulley with two flanges, which engages with a toothed belt.

BACKGROUND

For a toothed pulley that engages with a toothed belt, a pulley with two flanges that are respectively provided on both sides of the pulley in a width direction is often used to prevent the toothed belt from being disconnected (the description in paragraph [0002] in Patent Literature (PTL) 1, for example).

Integral molding of the toothed pulley with two flanges using a synthetic resin material in a mold for injection molding causes the flanges to be caught in the mold, preventing the molded toothed pulley from being pulled out from the mold in the axial direction. Accordingly, the toothed pulley with two flanges is separated into a pulley body with one flange and a flange body with the other flange and is molded using separate injection molds, so as to be pulled out in the axial direction (see the description in paragraph [0003] in PTL 1, for example). The molded pulley body and flange body may be joined using ultrasonic welding, for example.

CITATION LIST

Patent Literature

PTL 1: Japanese Unexamined Patent Application Publication No. 2013-96500

SUMMARY

Technical Problem

When the pulley body and the flange body are joined by ultrasonic welding, weld burrs ejecting from a joint are one of problems (see the description in paragraph [0004] in PTL 1, for example). If there are the weld burrs, parts cannot be assembled, and weld burrs that have fallen off may become trapped between the parts, leading to malfunctions. Accordingly, it is necessary to remove the weld burrs, which increases a manufacturing cost. It is also necessary to increase joint strength between the pulley body and the flange body to prevent the toothed belt from being disconnected.

An object of the present invention is to provide a pulley with two flanges, which prevents weld burrs from ejecting even when a pulley body with one flange and a flange body with the other flange are joined by ultrasonic welding, and increases joint strength between the pulley body and the flange body.

Solution to Problem

A pulley with two flanges according to the present invention includes: a pulley body made of a synthetic resin; and a flange body that is made of a synthetic resin and joined to the pulley body in a concave-convex fitting state. The pulley body includes a resin portion including teeth, and a cylindrical core metal. The resin portion includes: a first flange that protrudes outward in a radial direction perpendicular to a rotation axis, at a first end of the resin portion in an axial direction parallel to the rotation axis; and a fitting protrusion that has a cylindrical shape protruding in the axial direction, at a second end of the resin portion in the axial direction. The flange body includes: a second flange that protrudes outward in the radial direction; a fitting recess that has a cylindrical shape depressed in the axial direction to fit to the fitting protrusion; and an inner-diameter portion that has a cylindrical shape to be positioned inward of the fitting recess in the radial direction.

The inner-diameter portion includes: a first outer cylindrical surface that faces an inner cylindrical surface of the resin portion, the inner cylindrical surface of the resin portion connecting to an inner cylindrical surface of the fitting protrusion; and a second outer cylindrical surface that has a diameter reduced inward in the radial direction from an end of the first outer cylindrical surface in the axial direction, the end being close to the first end, and faces an inner cylindrical surface of the core metal or the inner cylindrical surface of the resin portion, the inner cylindrical surface of the resin portion covering a part of the core metal in the axial direction, the part including an end face close to the second end. The pulley body and the flange body are joined by ultrasonic welding with molten resin in a resin reservoir that is defined by: a first space defined by a first gap and a second gap, the first gap being between an annular connecting surface connecting the first outer cylindrical surface and the second outer cylindrical surface and one of the end face of the core metal and an end face of the resin portion covering the end face of the core metal, the second gap being between the second outer cylindrical surface and the inner cylindrical surface of the resin portion; and a second space defined by a third gap between the second outer cylindrical surface and one of the inner cylindrical surface of the core metal and the inner cylindrical surface of the resin portion.

In the pulley with two flanges according to the embodiments of the present invention, the first space and the second space are used as the resin reservoir for molten resin when the pulley body and the flange body are joined by the ultrasonic welding. The molten resin can be collected in the first space, or the first space and the second space, which are the resin reservoirs, so that weld burrs do not eject from the joint between the pulley body and the flange body. When the solidified portion of the molten resin enters the first space and spans the inner cylindrical surface of the resin portion, which connects to the inner cylindrical surface of the fitting protrusion, and the second outer cylindrical surface of the inner-diameter portion, the joint strength of the pulley body and the flange body can be enhanced.

The second end side of the core metal in the axial direction may not be covered by the resin portion. In such a case, when the molten resin contacts the end face of the core metal at the second end side in the axial direction, changes the direction, and enters the second space from the first space, the molten resin contacts the annular end face and the inner cylindrical surface of core metal. Since the core metal is made of metal, the molten resin in contact with the core metal is deprived of its heat, so that the molten resin is cooled to solidify easily. Therefore, the effect of preventing overflow of the molten resin from the joint is enhanced.

Advantageous Effects

As described above, according to the present invention, a pulley with two flanges is obtained, which prevents weld burrs from ejecting even when a pulley body with one flange and a flange body with the other flange are joined by ultrasonic welding, and increases joint strength between the pulley body and the flange body.

DESCRIPTION OF EMBODIMENTS

Hereinafter, embodiments according to the present invention are described with reference to the drawings.

Figure 2:
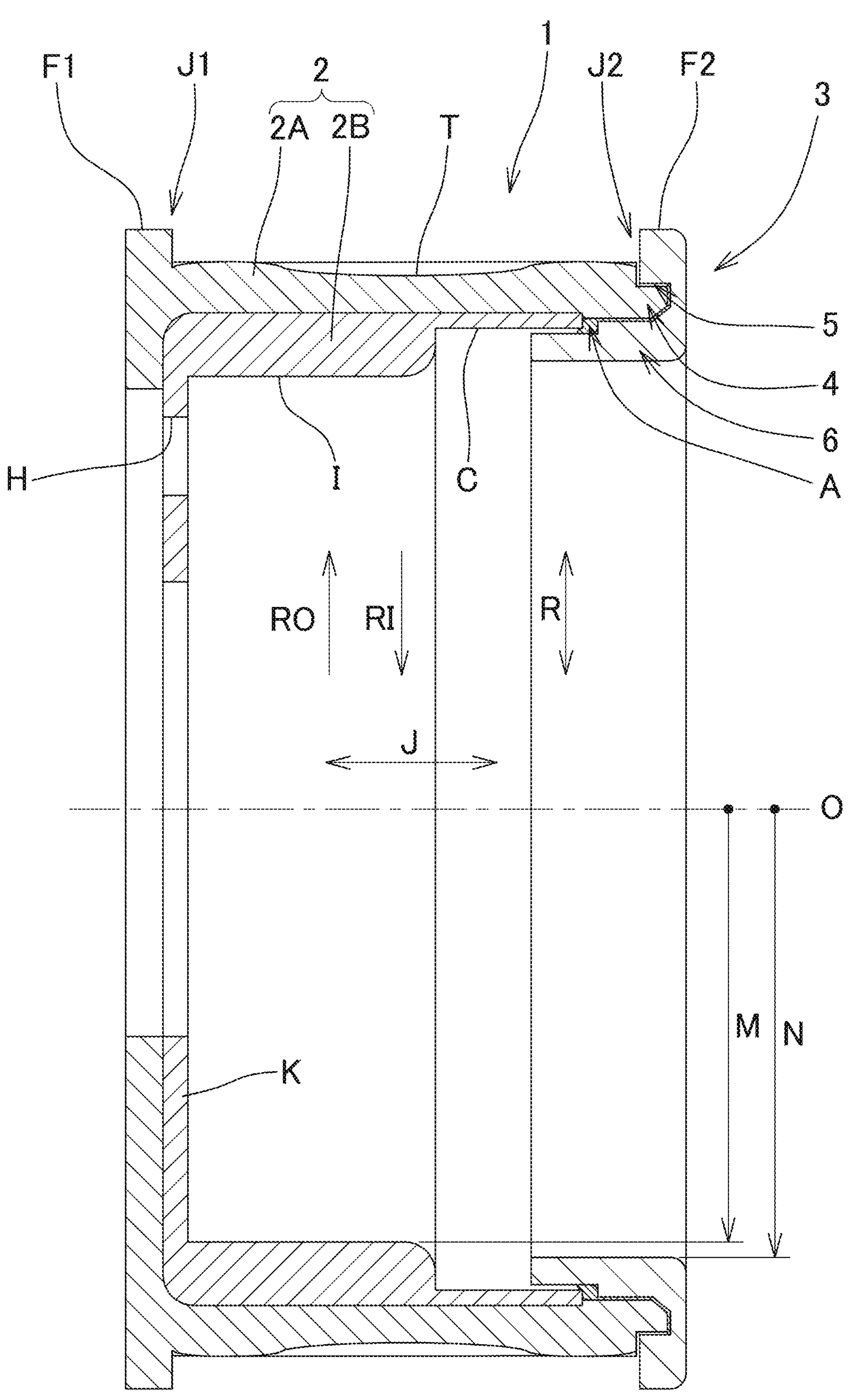
FIG. 2 is a vertical cross-sectional view of the pulley with two flanges shown in FIG. 1.

In the description of the specification, a direction parallel to the rotation axis (see a reference sign O in FIG. 2) of a pulley 1 with two flanges is referred to as an "axial direction" (see an arrow J in FIG. 2), and a direction orthogonal to the rotation axis is referred to as a "radial direction" (see an arrow R in FIG. 2).

In the description of the specification, the radial direction approaching the rotation axis is referred to as a "radially inward direction" (e.g., see an arrow RI in FIG. 2), and the radial direction away from the rotation axis is referred to as a "radially outward direction" (e.g., see an arrow RO in FIG. 2).

Referring to FIG. 2, for example, an end of a resin portion 2A on the side close to a first flange F1 in an axial direction J is a first end J1, and an end of the resin portion 2A on the side close to a fitting protrusion 4 in the axial direction J is a second end J2. In the pulley 1 with two flanges and its component parts in the description of the specification, the side close to the first flange F1 is referred to as a first end J1 side in the axial direction J, and the side close to the second flange F2 as a second end J2 side in the axial direction J.

[Pulley with Two Flanges]

Figure 1:
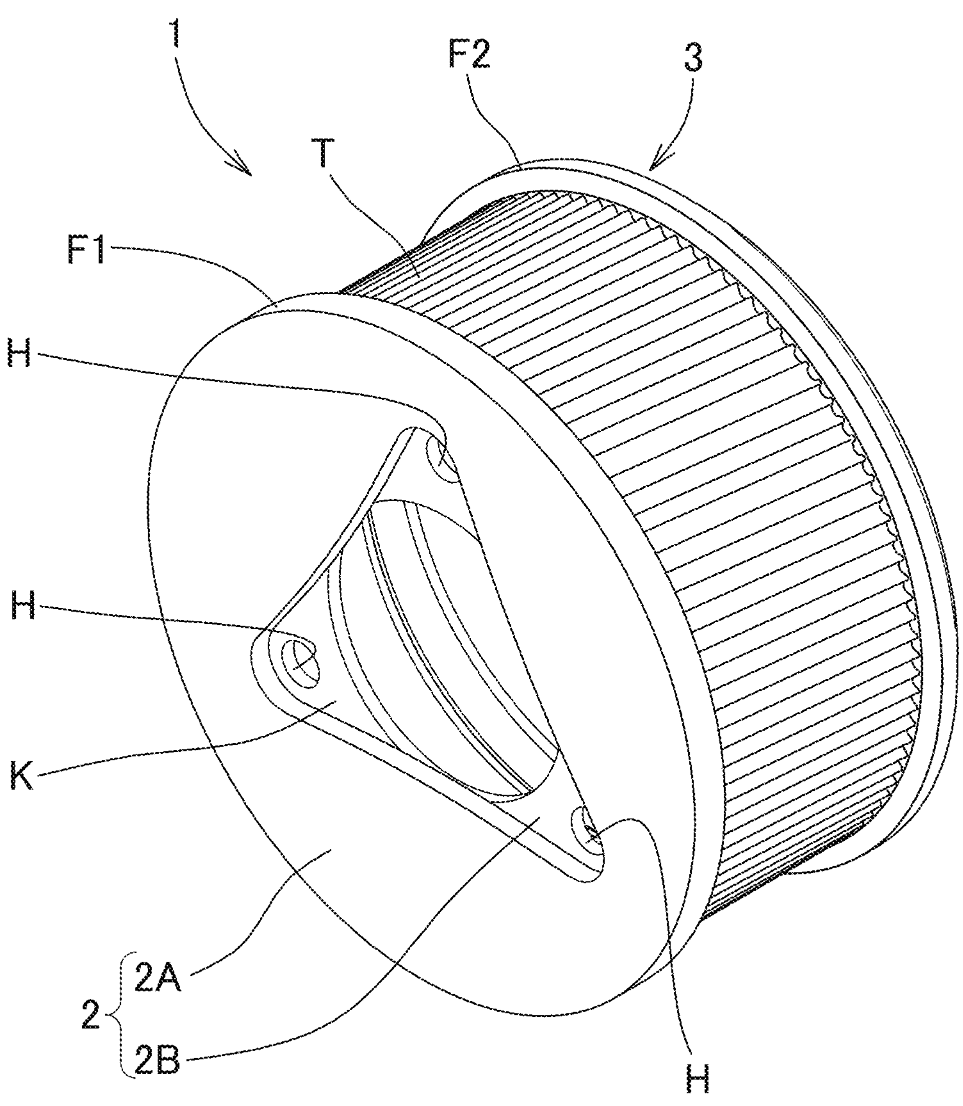
FIG. 1 is a perspective view of a pulley with two flanges according to an embodiment of the present invention.

The pulley 1 with two flanges according to the embodiment of the present invention as shown in FIGS. 1 and 2, is used in a power transmission mechanism of an electric power steering device, for example. The pulley 1 with two flanges has a pulley body 2 made of a synthetic resin and a flange body 3 that is made of a synthetic resin and is joined to the pulley body 2 in a concave-convex fit.

The pulley body 2 has the resin portion 2A including teeth T and a cylindrical core metal 2B. The teeth T on an outer peripheral surface of the pulley body 2 are helical teeth, and are engaged with teeth of a toothed belt (not shown).

In the pulley 1 with two flanges according to the embodiment of the present invention, the resin portion 2A including the teeth T in the pulley body 2 and the flange body 3 are made of the synthetic resin, so that a weight of the pulley 1 with two flanges can be reduced.

[Core Metal]

The core metal 2B has a bottom plate K at an end in the first end J1 side in the axial direction J. The bottom plate K is provided with a plurality of attachment holes H extending in the axial direction J (in the present embodiment, three round holes equally spaced in the circumferential direction). Bolts respectively threaded through the attachment holes H in the core metal 2B can easily and securely fix the pulley 1 with two flanges to a member to which the pulley 1 with two flanges is attached.

An inner cylindrical surface I of the core metal 2B on the first end J1 side in the axial direction J is exposed. An inner diameter M of the core metal 2B is smaller than an inner diameter N of the flange body 3 (M<N), and the inner cylindrical surface I is used for positioning the pulley 1 with two flanges in the radial direction R with respect to a nut of a ball screw in the power transmission mechanism of an electric power steering device (not shown). The core metal 2B is prepared by pressing a cold-rolled steel sheet, a hot-rolled steel sheet, or a high-tensile steel sheet. The inner cylindrical surface I of the core metal 2B may be covered with resin. In this case, an inner diameter of the resin covering the inner cylindrical surface I of the core metal 2B is made smaller than the inner diameter N of the flange body 3.

Figure 3:
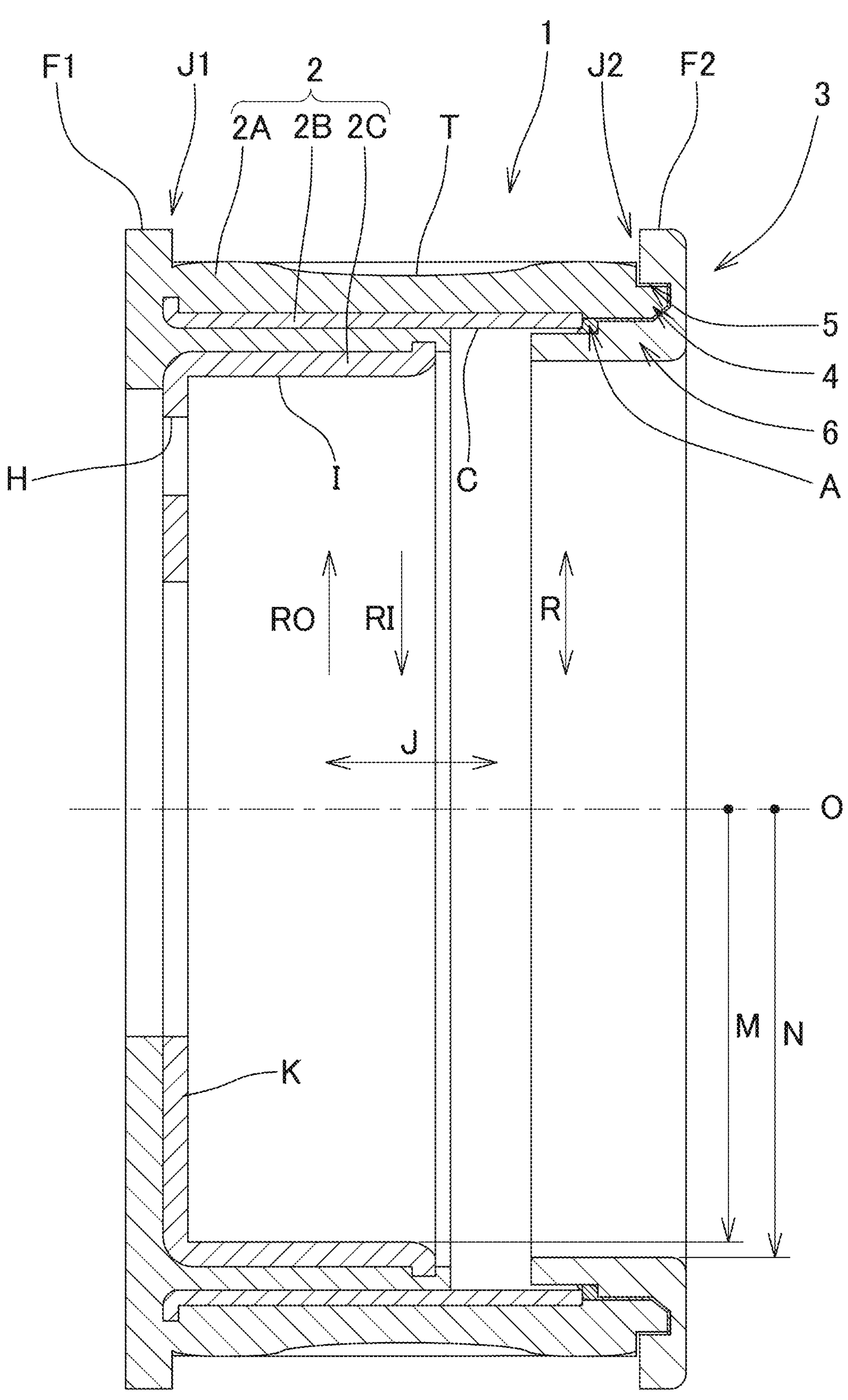
FIG. 3 is a vertical cross-sectional view of a modification of the pulley with two flanges, which includes a core metal having a double structure.

The core metal that is integrated with the resin portion 2A may have a double structure including a thin-walled core metal 2B and a core metal 2C, as shown in FIG. 3. In this case, the bottom plate K is provided at an end of the core metal 2C in the radially inward direction RI on the first end J1 side in the axial direction J. The inner diameter M of the core metal 2C is smaller than the inner diameter N of the flange body 3 (M<N), and the inner cylindrical surface I of the core metal 2C is used for positioning the pulley 1 with two flanges in the radial direction R with respect to the nut of the ball screw in the power transmission mechanism of the electric power steering device (not shown). The core metal 2C is prepared by, similar to the core metal 2B, pressing a cold-rolled steel sheet, a hot-rolled steel sheet, or a high-tensile steel sheet. The inner cylindrical surface I of the core metal 2C may be covered with resin. In this case, an inner diameter of the resin covering the inner cylindrical surface I of the core metal 2C is made smaller than the inner diameter N of the flange body 3.

The cylindrical core metal 2B in FIGS. 2 and 3 is located in the radially inward direction RI of the teeth T and is sufficiently long in the axial direction J to satisfy required accuracy of the synthetic-resin teeth T with which the toothed belt is engaged.

[Resin Portion and Flange Body]

The resin portion 2A and the flange body 3 are made of, for example, a thermoplastic resin, such as PBT, PA6, PA66, PA46, PPS, and PEEK. Among them, PPS that is superior in terms of heat resistance, mechanical properties, flame resistance, and dimensional stability is preferably blended with several tens of weight percent of glass fiber as a reinforcement material.

The resin portion 2A has a first flange F1 protruding in the radially outward direction RO at the first end J1 in the axial direction J and a cylindrical fitting protrusion 4 protruding in the axial direction J at the second end J2 in the axial direction J. The fitting protrusion 4 is stepped down in the radially inward direction RI from tooth surfaces of the teeth T with which the toothed belt is engaged.

The flange body 3 includes a second flange F2 that is located at the second end J2 side in the axial direction J and protrudes in the radially outward direction RO, a cylindrical fitting recess 5 that fits to the fitting protrusion 4 and is depressed in the axial direction J, and a cylindrical inner-diameter portion 6 located in the radially inward direction RI in the fitting recess 5.

[Inner Diameter Portion]

Figure 4:
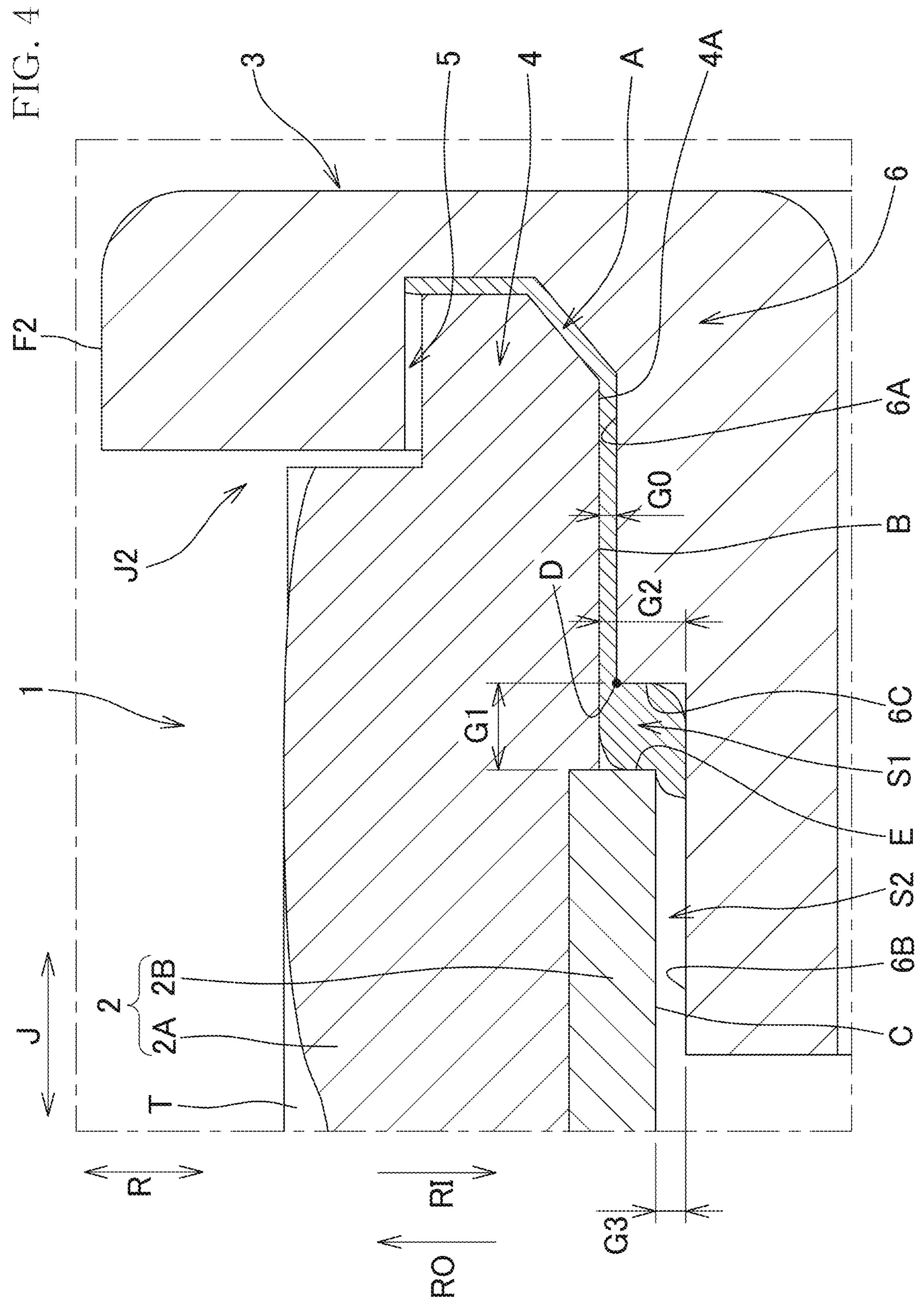
FIG. 4 is a vertical cross-sectional view of an enlarged main part of a solidified portion of molten resin.

As shown in FIG. 4, the inner-diameter portion 6 has a first outer cylindrical surface 6A and a second outer cylindrical surface 6B. The first outer cylindrical surface 6A faces the inner cylindrical surface B of the resin portion 2A, which connects to the inner cylindrical surface 4A of the fitting protrusion 4. The second outer cylindrical surface 6B reduces its diameter in the radially inward direction RI from an end D of the first outer cylindrical surface 6A in the first end J1 side, and faces the inner cylindrical surface C of the core metal 2B.

There is a gap G0 between the first outer cylindrical surface 6A and the inner cylindrical surface 4A, as well as between the first outer cylindrical surface 6A and the inner cylindrical surface B. There is a first gap G1 between an annular connecting surface 6C connecting the first outer cylindrical surface 6A with the second outer cylindrical surface 6B and an end face E of the core metal 2B on the second end J2 side in the axial direction J. There is a second gap G2 between the second outer cylindrical surface 6B and the inner cylindrical surface B of the resin portion 2A, and a third gap G3 between the second outer cylindrical surface 6B and the inner cylindrical surface C of the core metal 2B.

A size of the first gap G1 is set as G1≥G0, and is adjusted according to an amount of molten resin at joining the pulley body 2 and the flange body 3 by ultrasonic welding, as well as required specifications for the joint strength between the pulley body 2 and flange body 3.

[Resin Reservoir, Solidified Portion of Molten Resin]

In the pulley 1 with two flanges according to the embodiment of the present invention, a first space S1 defined by the first gap G1 and the second gap G2, and a second space S2 defined by the third gap G3 are resin reservoirs of molten resin at a time when the pulley body 2 and the flange body 3 are joined by the ultrasonic welding.

Figure 5:
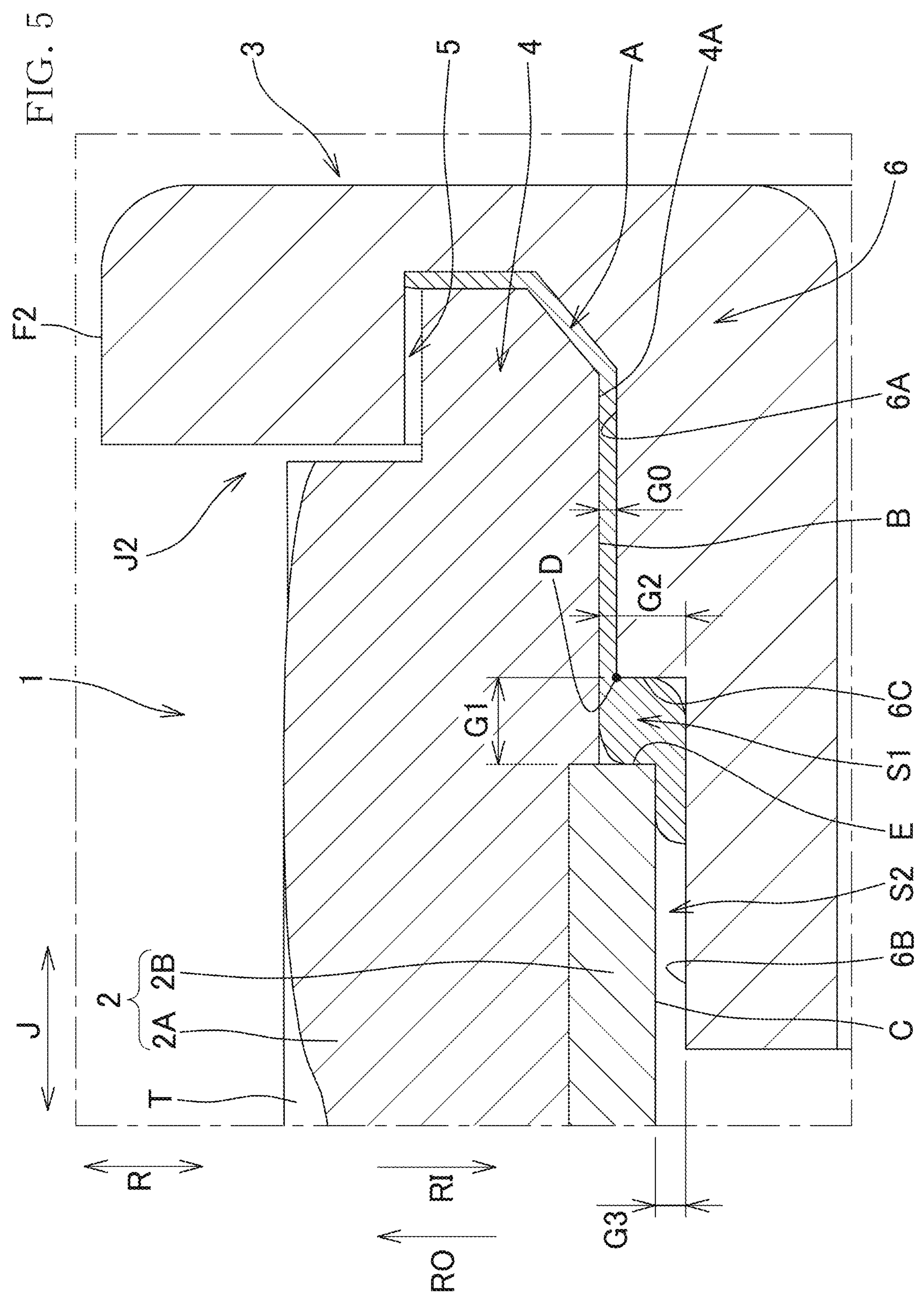
FIG. 5 is a vertical cross-sectional view of an enlarged main part of another solidified portion of the molten resin.

When the pulley body 2 and flange body 3 are joined using an ultrasonic welding machine, the molten resin enters the first space S1 over the end D of the first outer cylindrical surface 6A on the first end J1 side. Referring to the examples in FIGS. 4 and 5, the molten resin contacts the annular end face E of the core metal 2B on the second end J2 side in the axial direction J and changes the direction to the radially inward direction RI before entering the second space S2.

For example, in FIG. 4, a solidified portion A of the molten resin, which is formed at a time when the pulley body 2 and flange body 3 are joined by the ultrasonic welding, has entered the first space S1 to a position slightly inside the second space S2. In the example in FIG. 5, which shows a larger amount of the molten resin than that in FIG. 4, the solidified portion A of the molten resin has further entered the second space S2.

[Modification of Resin Portion of Pulley Body]

Figure 6:
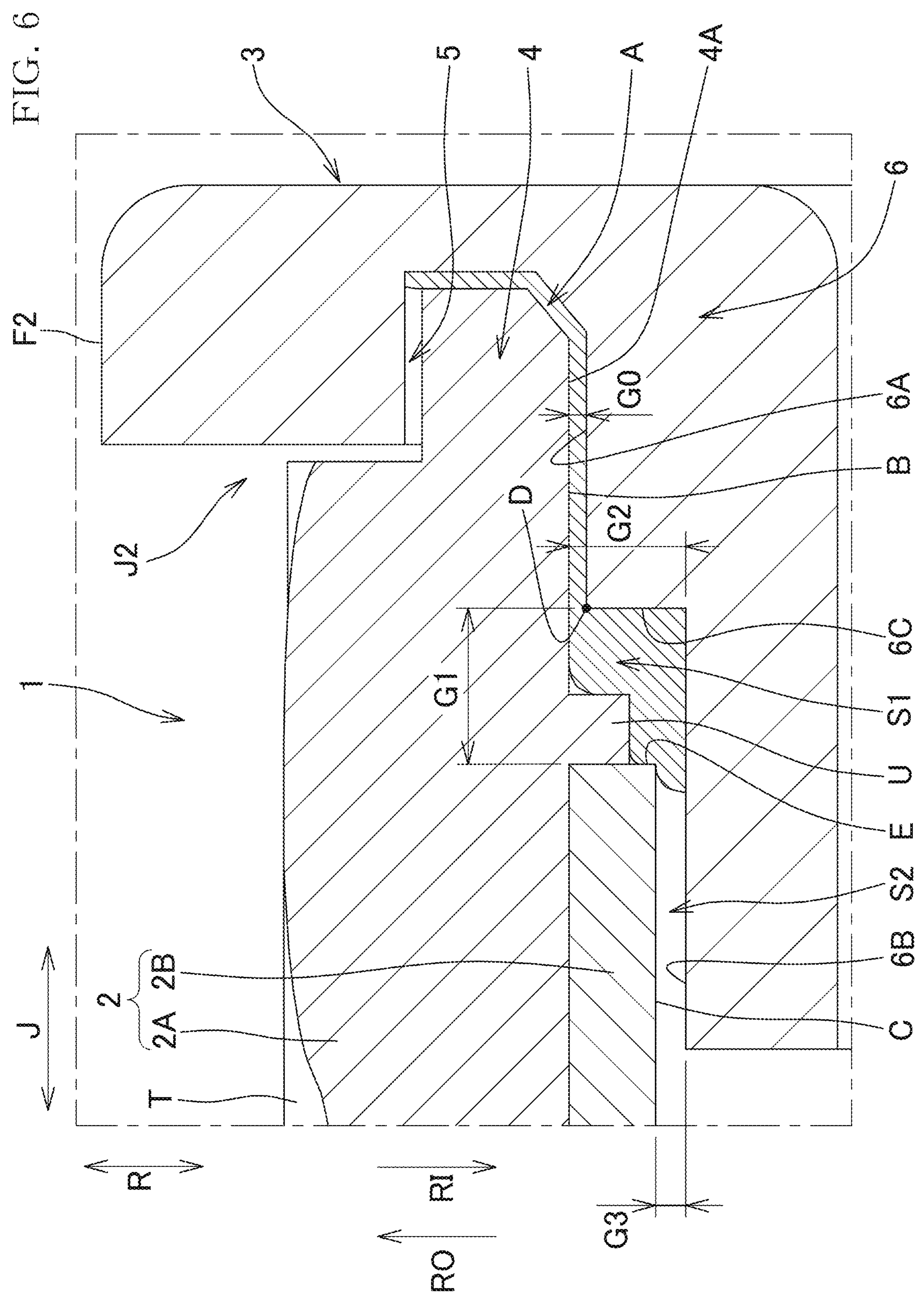
FIG. 6 is a vertical cross-sectional view of a modification of the resin portion of a pulley body.

As shown in FIG. 6, the resin portion 2A of the pulley body may be provided with a core metal receiving portion U that receives the annular end face E of the core metal 2B. This enhances the effect of retaining the core metal 2B.

Figure 7:
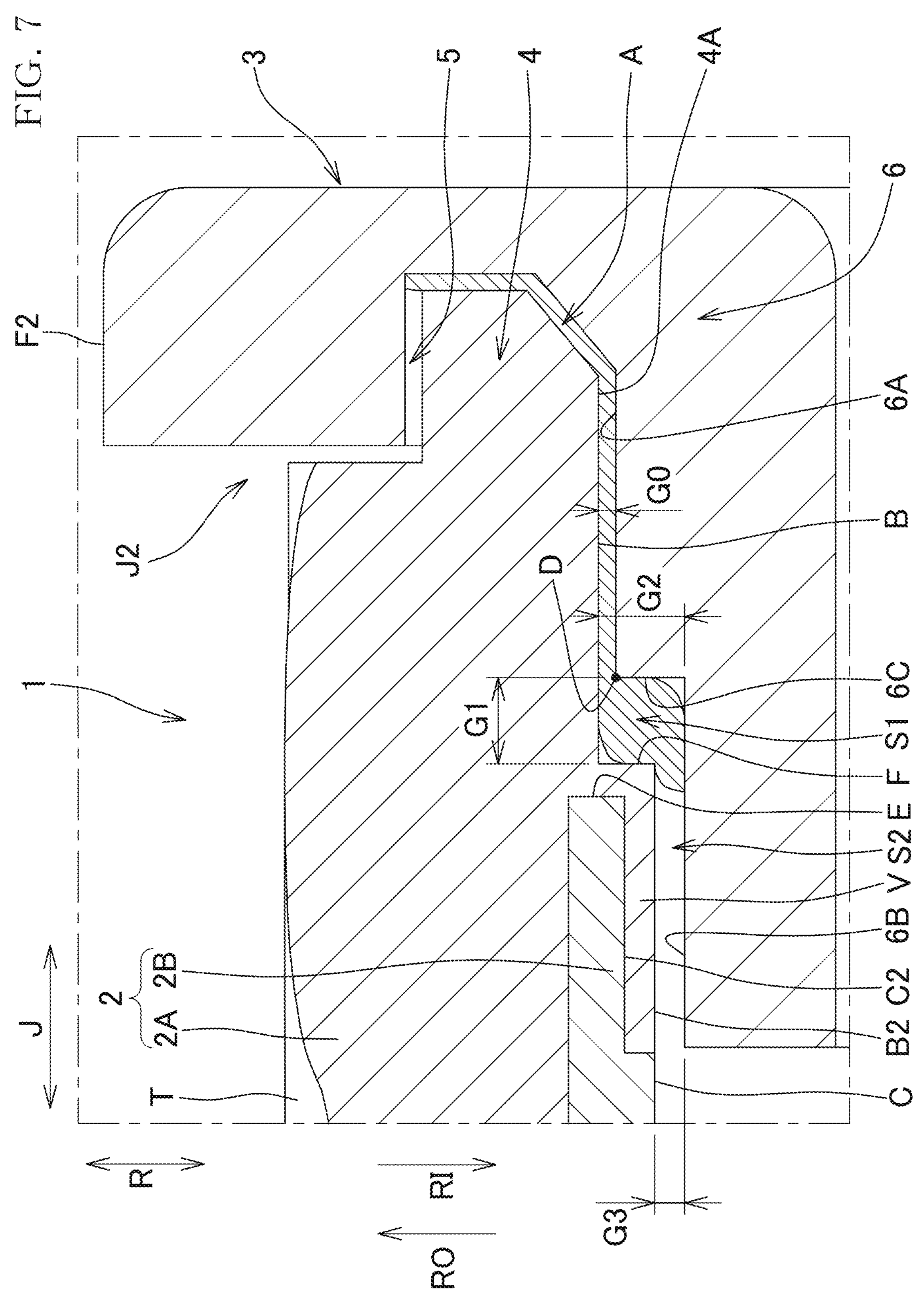
FIG. 7 is a vertical cross-sectional view of a modification of the core metal and the resin portion of the pulley body.

As shown in FIG. 7, the resin portion 2A of the pulley body may be provided with a covering portion V that covers the second end J2 side of the core metal 2B in the axial direction J. This further enhances the effect of retaining the core metal 2B. In the example of FIG. 7, the first gap G1 is provided between the annular connecting surface 6C and an end face F of the covering portion V, which is a resin portion covering the end face E of the core metal 2B. The third gap G3 defining the second space S2 is provided between the second outer cylindrical surface 6B and the inner cylindrical surface B2 of the covering portion V. In a preferable embodiment, a diameter of the inner cylindrical surface C2 of the core metal 2B on the second end J2 side in the axial direction J is increased so that the inner cylindrical surface B2 of the covering portion V and the inner cylindrical surface C of the core metal 2B are flush, as shown in FIG. 7.

In a structure in which the core receiving portion U that receives the annular end face E of the core metal 2B is provided as shown in FIG. 6, or a structure in which the covering portion V that covers the second end J2 side of the core metal 2B in the axial direction J is provided as shown in FIG. 7, effects described below are also obtained in addition to the effect of retaining the core metal 2B as described above.

For improving the accuracy in the teeth T, with which a belt is transferred, the core metal 2B should be positioned in the radially inward direction RI of the teeth T as a large area as possible in the length of the teeth T in the axial direction J along which the toothed belt is engaged. In this case, it is necessary that the annular end face E of the core metal 2B is brought closer to the second flange F2. If the end face E is brought closer to the second flange F2 in the structure shown in FIG. 4, length of the gap G0 in the axial direction J becomes shorter. This causes a distance where the welding function of the ultrasonic welding is developed becomes shorter. If the end face E is brought closer to the second flange F2 in the structure shown in FIG. 6 or FIG. 7, the molten resin contacts, only with its small part, the core metal 2B made of metal in the first space S1 in the structure of FIG. 6, or the molten resin does not contact the core metal 2B made of metal in the first space S1 in the structure of FIG. 7. Accordingly, heat of the molten resin is not easily lost in the first space S1. Therefore, in the structure of FIG. 6 or FIG. 7, the molten resin at high temperature flows into the first space S1, so that the joint strength by welding in the first space S1 can be greater.

[Example of Process of Joining Pulley Body and Flange Body by Ultrasonic Welding Machine]

Figure 8:
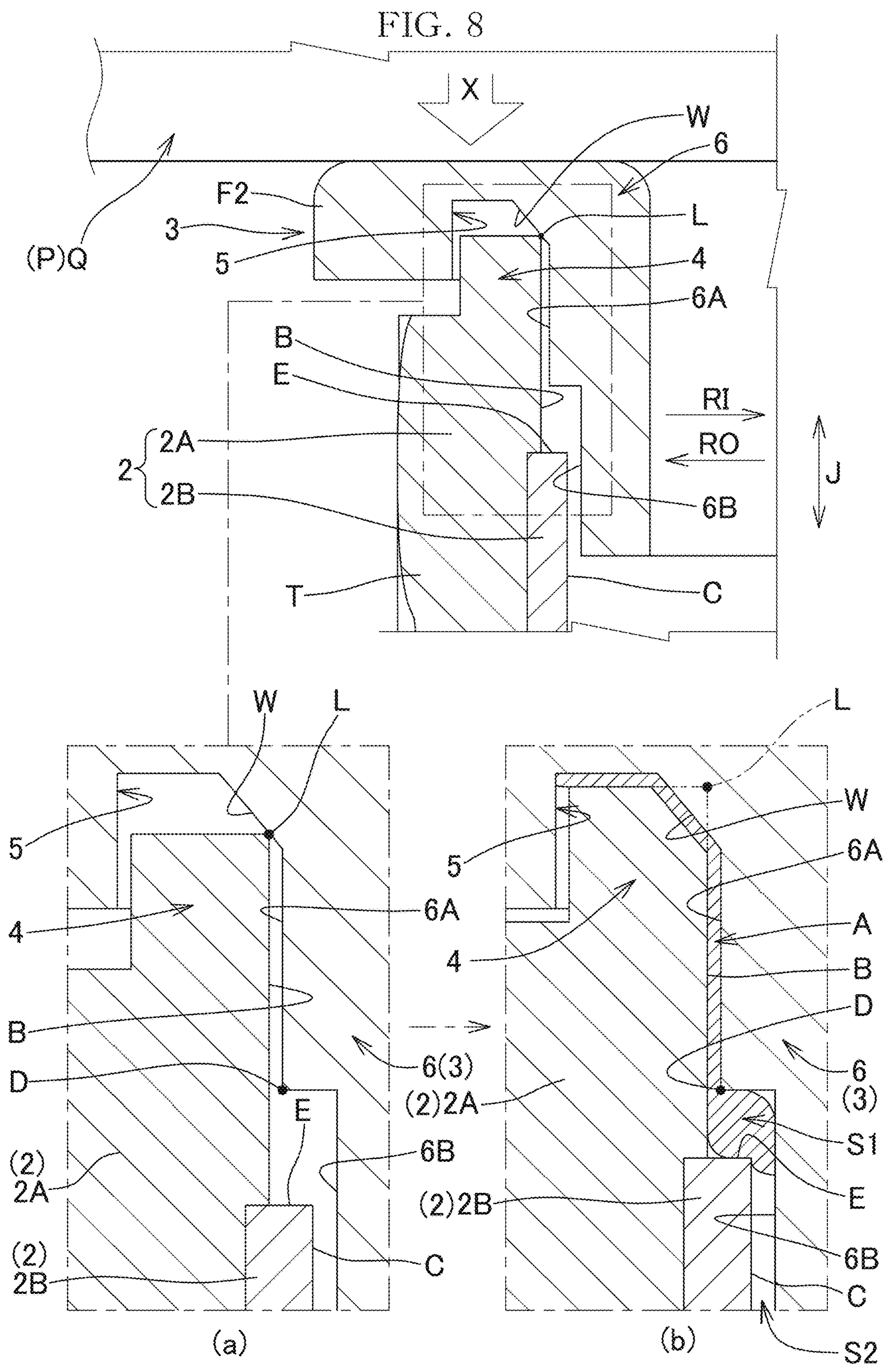
FIG. 8 is an explanatory view of a process of joining the pulley body and a flange body using an ultrasonic welding machine.

With reference to FIG. 8, the fitting protrusion 4 of the pulley body 2 before joining the flange body 3 has, on its tip in the radially inward direction RI, a circular-shaped corner L. The pulley body 2 having such a shape is installed so that the axial direction J is a vertical direction with the fitting protrusion 4 facing upward and the first flange F1 on the lower side.

Then, the flange body 3 is placed on the pulley body 2 so that the fitting recess 5 fits to the fitting protrusion 4 of the pulley body 2. The circular-shaped corner L of the fitting protrusion 4 of the pulley body 2 contacts an inclined surface W that is a side surface of a circular truncated cone of the fitting recess 5 of the flange body 3.

Next, while a horn Q of an ultrasonic welding machine P presses the flange body 3 downward as shown by an arrow X in the pressing direction, ultrasonic vibration of the horn Q propagates inside the flange body 3 and the pulley body 2 to generate frictional heat, melting the circular-shaped corner L of the pulley body 2 mainly (from (a) to (b) of FIG. 8).

Since the corner L of the pulley body 2 in the radially inner direction RI melts mainly, the molten resin easily flows downward from an end of the inclined surface W of the side surface of the circular truncated cone in the radially inward direction RI as shown in (b) of FIG. 8, and the molten resin enters the first space S1 and the second space S2, which are, for example, the resin reservoirs. The molten resin is cooled and solidifies so as to be the solidified portion A of the molten resin.

[Effects]

In the pulley 1 with two flanges according to the embodiments of the present invention, the first space S1 and the second space S2 are used as the resin reservoirs for molten resin when the pulley body 2 and the flange body 3 are joined by the ultrasonic welding. Therefore, the molten resin can be collected in the first space S1, or the first space S1 and the second space S2, which are the resin reservoirs, so that weld burrs do not eject from the joint between the pulley body 2 and the flange body 3. When the solidified portion A of the molten resin enters the first space S1 and spans the inner cylindrical surface B of the resin portion 2A, which connects to the inner cylindrical surface 4A of the fitting protrusion 4, and the second outer cylindrical surface 6B of the inner-diameter portion 6, the joint strength of the pulley body 2 and the flange body 3 can be enhanced.

The second end J2 side of the core metal 2B in the axial direction J may not be covered by the resin portion 2A (i.e., a structure in which the covering portion V of FIG. 7 is not provided). In such a case, when the molten resin contacts the end face E of the core metal 2B at the second end J2 side in the axial direction J, changes the direction, and enters the second space S2 from the first space S1, the molten resin contacts the annular end face E and the inner cylindrical surface C of core metal 2B. Since the core metal 2B is made of metal, the molten resin in contact with the core metal 2B is deprived of its heat, so that the molten resin is cooled to solidify more easily. Therefore, the effect of preventing overflow of the molten resin from the joint is enhanced.

All of the above descriptions are examples and the present invention is not limited thereto. Various improvements and changes can be made without departing from the scope of the invention.

The invention claimed is:

1. A pulley with two flanges, the pulley comprising:
- a pulley body made of a synthetic resin; and
- a flange body that is made of a synthetic resin and joined to the pulley body in a concave-convex fitting state, wherein
- the pulley body includes a resin portion including teeth, and a cylindrical core metal,
- the resin portion includes:
  - a first flange that protrudes outward in a radial direction perpendicular to a rotation axis, at a first end of the resin portion in an axial direction parallel to the rotation axis; and
  - a fitting protrusion that has a cylindrical shape protruding in the axial direction, at a second end of the resin portion in the axial direction,
- the flange body includes:
  - a second flange that protrudes outward in the radial direction;
  - a fitting recess that has a cylindrical shape depressed in the axial direction to fit to the fitting protrusion; and
  - an inner-diameter portion that has a cylindrical shape to be positioned inward of the fitting recess in the radial direction,
- the inner-diameter portion includes:
  - a first outer cylindrical surface that faces an inner cylindrical surface of the resin portion, the inner cylindrical surface of the resin portion connecting to an inner cylindrical surface of the fitting protrusion; and
  - a second outer cylindrical surface that has a diameter reduced inward in the radial direction from an end of the first outer cylindrical surface in the axial direction, the end being close to the first end, and faces an inner cylindrical surface of the core metal or the inner cylindrical surface of the resin portion, the inner cylindrical surface of the resin portion covering a part of the core metal in the axial direction, the part including an end face close to the second end,
  - the pulley body and the flange body are joined by ultrasonic welding with molten resin in a resin reservoir that is defined by:
  - a first space defined by a first gap and a second gap, the first gap being between an annular connecting surface connecting the first outer cylindrical surface and the second outer cylindrical surface and one of the end face of the core metal and an end face of the resin portion covering the end face of the core metal, the second gap being between the second outer cylindrical surface and the inner cylindrical surface of the resin portion; and
  - a second space defined by a third gap between the second outer cylindrical surface and one of the inner cylindrical surface of the core metal and the inner cylindrical surface of the resin portion.

* * * * *